(12) United States Patent
Heie

(10) Patent No.: US 7,715,883 B2
(45) Date of Patent: May 11, 2010

(54) ALERT SIGNAL GENERATION

(75) Inventor: Anders Fahnoe Heie, Poway, CA (US)

(73) Assignee: Nokia Corporation, Espoo (FI)

( * ) Notice: Subject to any disclaimer, the term of this patent is extended or adjusted under 35 U.S.C. 154(b) by 734 days.

(21) Appl. No.: 10/312,262

(22) PCT Filed: Jul. 10, 2001

(86) PCT No.: PCT/EP01/07949

§ 371 (c)(1), (2), (4) Date: Mar. 13, 2003

(87) PCT Pub. No.: WO02/07412

PCT Pub. Date: Jan. 24, 2002

(65) Prior Publication Data

US 2003/0153365 A1 Aug. 14, 2003

(30) Foreign Application Priority Data

Jul. 14, 2000 (GB) .................................. 0017398.9

(51) Int. Cl.
*H04M 1/00* (2006.01)
*H04B 1/38* (2006.01)
(52) U.S. Cl. .......................... 455/567; 84/600; 84/603; 84/606; 84/609; 84/610; 84/649; 84/650; 379/179; 379/207.16; 379/252; 379/418; 379/911
(58) Field of Classification Search ................ 455/567; 84/600–606, 609, 610, 649, 650
See application file for complete search history.

(56) References Cited

U.S. PATENT DOCUMENTS 4,472,069 A * 9/1984 Yamamoto .................. 368/273

| 5,452,354 | A | * | 9/1995 | Kyronlahti et al. ..... | 379/373.02 |
|---|---|---|---|---|---|
| 5,561,705 | A | * | 10/1996 | Allard et al. ................ | 455/564 |
| 5,923,878 | A | * | 7/1999 | Marsland .................... | 717/139 |
| 6,075,998 | A | * | 6/2000 | Morishima .................. | 455/567 |
| 6,281,421 | B1 | * | 8/2001 | Kawaguchi .................. | 84/603 |
| 6,308,086 | B1 | * | 10/2001 | Yoshino ....................... | 455/567 |
| 6,366,791 | B1 | * | 4/2002 | Lin et al. ..................... | 455/567 |
| 6,621,903 | B2 | * | 9/2003 | Oda ........................ | 379/374.01 |
| 6,675,026 | B2 | * | 1/2004 | Yoon .......................... | 455/567 |
| 6,707,908 | B1 | * | 3/2004 | Nagasawa ............... | 379/374.01 |
| 6,798,427 | B1 | * | 9/2004 | Suzuki et al. ................. | 84/604 |
| 6,944,277 | B1 | * | 9/2005 | Viikki ................... | 379/142.06 |

(Continued)

FOREIGN PATENT DOCUMENTS

DE 19623097 A1 12/1997

(Continued)

*Primary Examiner*—Duc Nguyen
*Assistant Examiner*—Zhiyu Lu
(74) *Attorney, Agent, or Firm*—Alston & Bird LLP

(57) ABSTRACT

An alert signal of a communication device (1), such as the ring signal of a mobile phone, comprises a set of musical samples that are played by the communication device in sequence. The sequence may be randomly generated, either in response to the event causing the alert or in a set up phase. Alternatively, the user of the device can create a tune to be used as the alert signal by creating a sequence of samples. The user selects samples from a list of samples to create the sequence of samples as individual samples may appear more than once in the tune.

30 Claims, 8 Drawing Sheets

U.S. PATENT DOCUMENTS

2001/0003822 A1 * 6/2001 Hibi et al. .................. 709/100

FOREIGN PATENT DOCUMENTS

| EP | 0684591 | A1 | 11/1995 |
| EP | 0795845 | A2 | 9/1997 |
| EP | 0851649 | A2 | 7/1998 |
| EP | 1109394 | A1 | 6/2001 |
| FI | 102711 | B | 1/1999 |
| WO | WO 0046976 | A1 | 8/2000 |

* cited by examiner

ALERT SIGNAL GENERATION

The present invention relates to alert signal generation.

Communications devices such as telephones, mobile phones and pagers generally produce an audible alert signal when a user needs to attend to the device, e.g. in the event of an incoming call or reception of a new message. Whilst such alert signals were originally simple repeating tone patterns, musical alert signals have now become commonplace. Some mobile phones allow the user to select from tunes programmed into the mobile phone by its manufacturer and others, e.g. the Ericsson SH888, allow the user to enter their own tunes note by note.

Most people are not musicians and find programming a pleasing tune into a device note-by-note extremely difficult, if not impossible. For these users, preprogrammed tunes have hitherto been the only option. The preprogrammed tunes are undesirable because they provide insufficient scope for personalisation. Such personalisation is not simply a matter of taste. In a crowded environment, for example a commuter train, it is desirable that each communication device produce a unique alert signal so that people do not mistakenly respond to an alert signal when their own device has actually remained silent.

According to the present invention, there is provided a method of alerting a user of a communications device to an incoming communication, the method comprising detecting an incoming communication, obtaining a sequence in which data defining a plurality of musical samples is to be read from a memory, and responding to the detection of an incoming communication by reading said data from the memory in the obtained sequence and generating an audio signal in dependence on said data.

According to the present invention, there is also provided a communication device, for example a mobile phone, comprising means for detecting an incoming communication, acoustic signal generation means for generating an acoustic signal, a memory storing data defining a plurality of musical samples, and processing means configured to read the data defining musical samples from the memory in a sequence and control the acoustic signal generator, in dependence thereon, so as to cause the acoustic signal generator to produce an alert signal defined by the read musical samples.

Musical samples are short bits of music, comprising at least one note or rest. Rests may be treated as "notes" with a frequency of zero Hz and explicitly defined. Alternatively, rests may be represented by gaps between periods for which there are explicit note defining data. It will be understood that the term "sample" in this context does not necessarily imply the sampling of an analogue or digital musical signal.

The musical samples may comprise time domain signal samples or frequency domain coefficients. However, it is preferred, in the interests of efficient use of memory, that the musical samples each comprise at least one set of digital codes, each set of codes comprising frequency-defining data and duration-defining data for each note of each sample, and optionally note start timing data.

Preferably, the frequency-defining data for each note comprises a code representing pitch quantised according to a predetermined scale, e.g. the major scale, the minor scale, the Japanese scale, the Hungarian major scale but preferably the chromatic scale The sequence may be obtained by a user entering the sequence using user input means or by generating a non-deterministic sequence, for example using a random number generating function.

The samples may be loaded into the memory during manufacture of a device. Alternatively, means may be provided so that a user can create the samples.

According to the present invention, there is further provided technical manifestation of software, the software comprising instructions for causing a communication device, comprising means for detecting an incoming communication, acoustic signal generation means for generating an acoustic signal, a memory storing data defining a plurality of musical samples and software-controllable processing means for reading from said memory and controlling the acoustic signal generation means, to operate in accordance with a method according to the present invention.

Said instructions are preferably represented by temporal or spatial variation of a physical property. The physical property may be charge in a memory cell, magnetic field magnitude or orientation, reflectivity or the phase or amplitude of an electromagnetic wave.

Embodiments of the present invention will now be described, by way of example, with reference to the accompanying drawings, in which.

Figure 1:
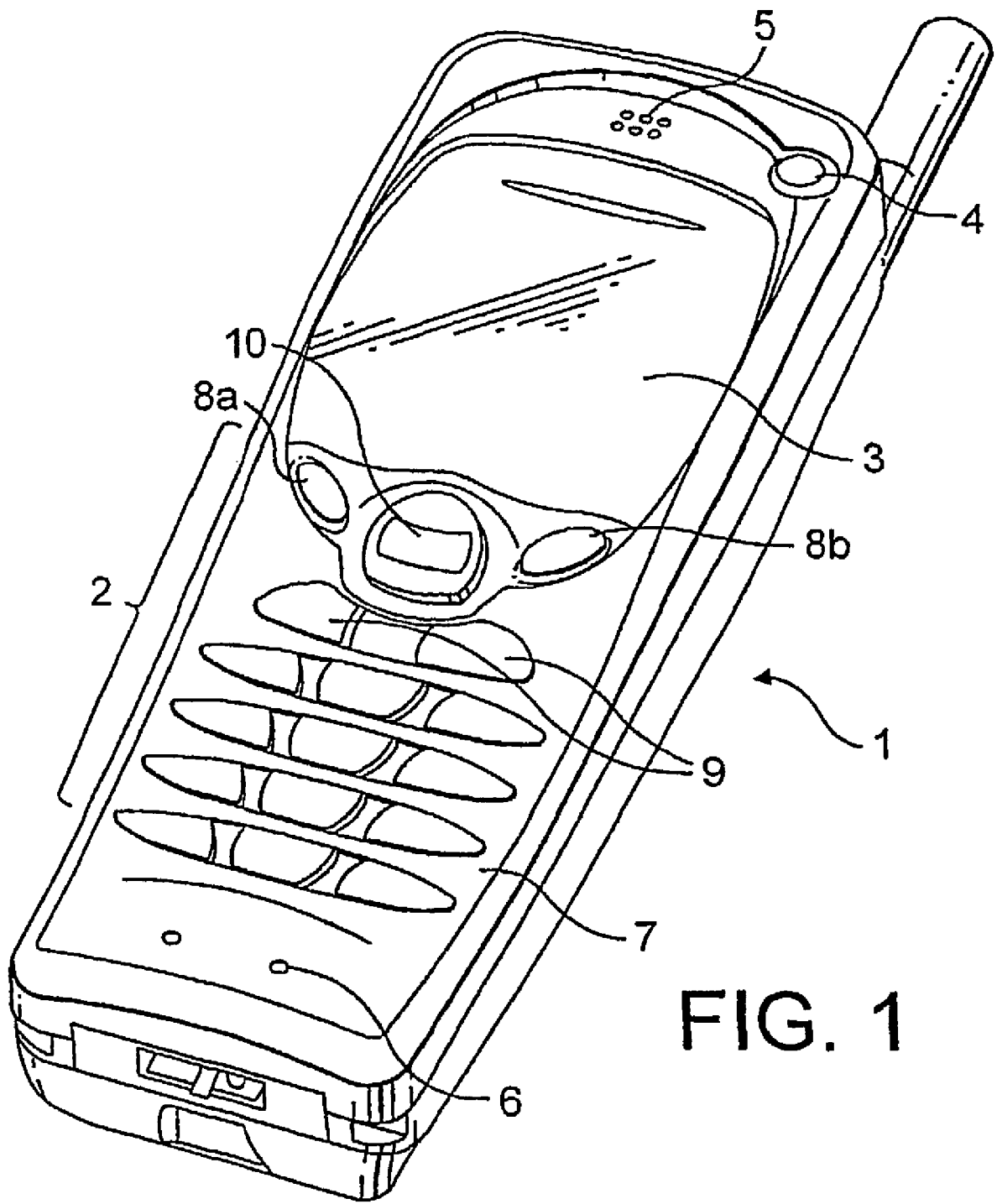
FIG. 1 shows the physical form of a mobile phone.

Referring to FIG. 1, a mobile phone has a user interface comprising a keypad 2, a liquid crystal display 3, an on/off button 4, a speaker 5 and a microphone 6.

The keypad 2 has a first group of keys 7 for the inputting of alphanumerical characters for dialing, generation of short message service messages, adding names, numbers to an internal list thereof etc. The keypad 2 additionally comprises left and right multifunction keys 8a, 8b, two call handling keys 9 and a "navigation" key 10. The functions of the multifunction keys 8 depend on the current state of the phone 1 and the navigation key 10 is used for navigating through menus displayed by the display 3.

The call handling keys 9 are used for establishing a call or a conference call, terminating a call or rejecting a call.

The navigation key 10 rocks about a transverse axis, a user pressing an upper part to move up a menu and a lower part to move down a menu.

Figure 2:
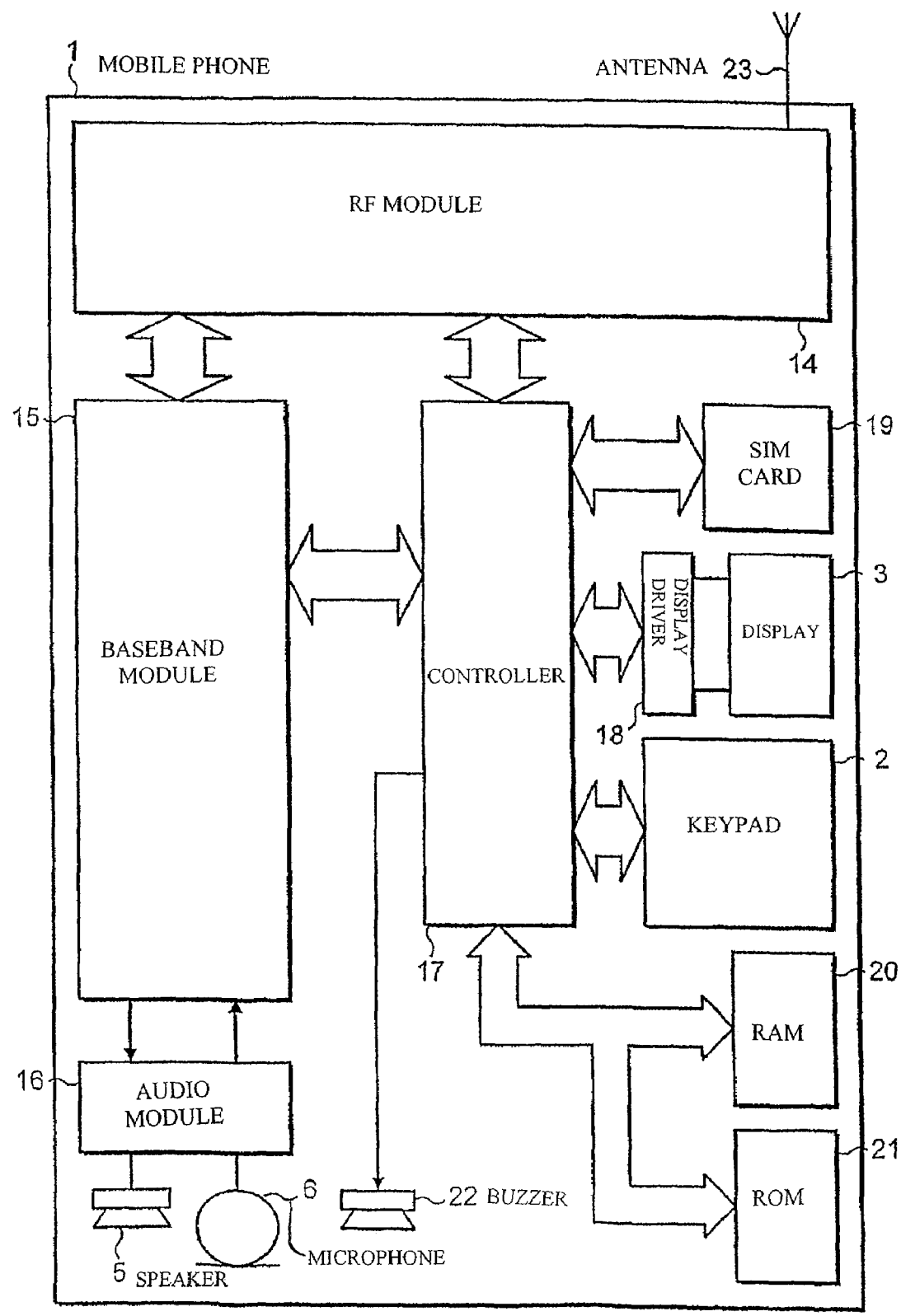
FIG. 2 is a block diagram of the mobile phone of FIG. 1.

Referring to FIG. 2, electronically the mobile phone 1 comprises an rf module 14 connected to an antenna 23, a baseband module 15, an audio module 16, a controller 17, a SIM card 19, a display driver 18 for the display 3, RAM 20, flash ROM 21 and a buzzer 22.

The rf and baseband modules 14, 15 are controlled by the controller 17 in accordance with user inputs, entered using the keypad 2, control programs stored in the ROM 21 and the contents of the SIM card 19 in a substantially conventional manner.

The audio module 16 provides analogue-to-digital conversion for signals from the microphone 6 so that they can be input to the baseband module 15. The audio module 16 also provide digital-to-analogue conversion and amplification of signals from the baseband module for signals to be output by the speaker 5.

The buzzer 22 is connected to a 1-bit output port of the controller 17.

Figure 3:
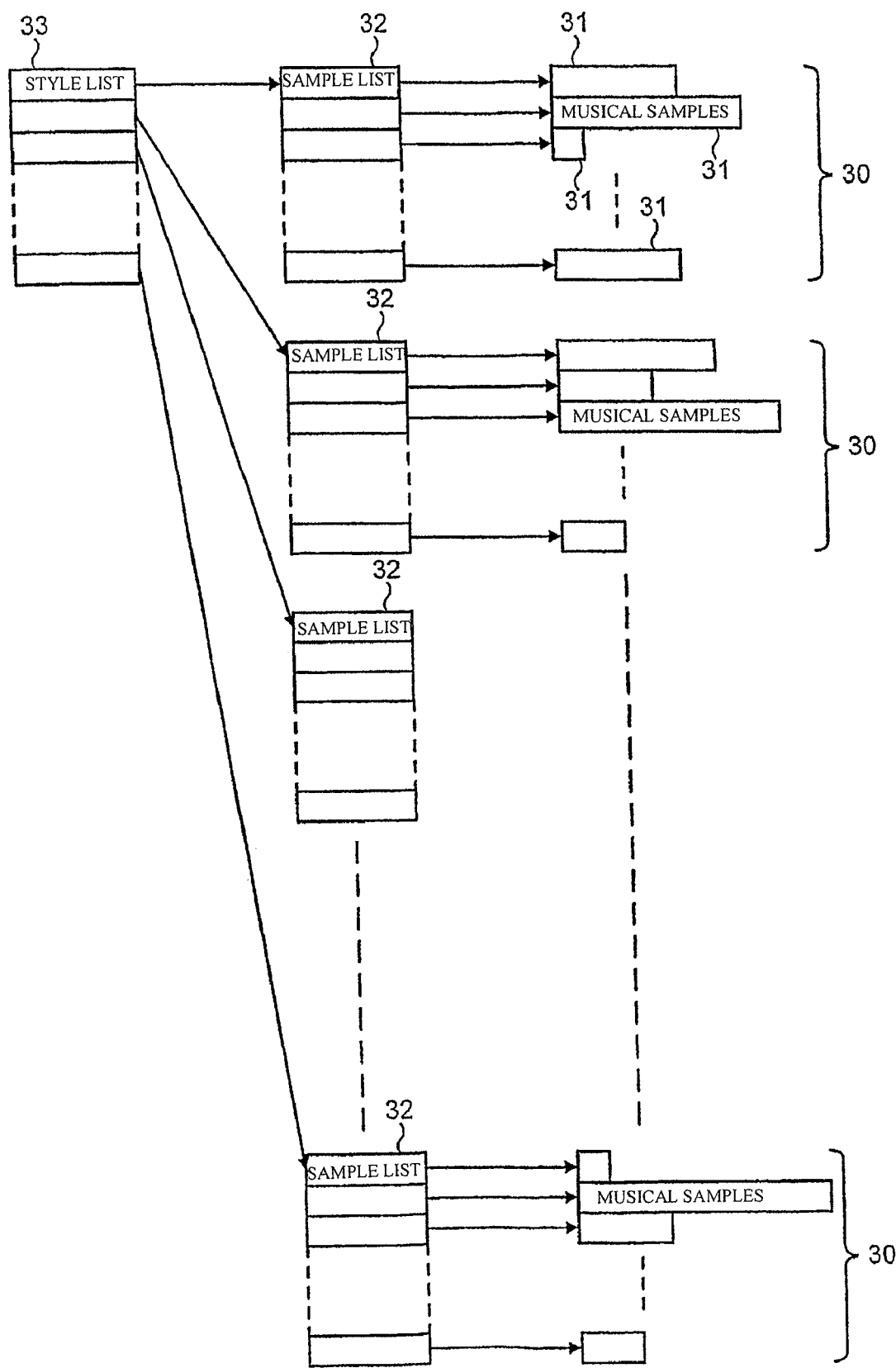
FIG. 3 illustrates part of the ROM of the mobile phone of FIG. 1.

Referring to FIG. 3, the ROM 21 contains a section given over to the storage of musical samples. These samples are available for the generation of a ringing signal by the phone. The samples are arranged in a plurality of groups 30, the members of each group 30 being characteristic of a different musical style, e.g. baroque, pop, dance, jazz, blues etc.. Each group contains the same number of members 31 and each member 31 consists of a sample name and a musical sample, at least one note long, with each note comprising a pitch value, a start time relative to the start of the sample (the sample may start with a rest), in the case of the first note, or the start of the previous note, in the case of subsequent notes, and a note duration. The end of each sample is marked by a null character. Each group 30 has a name and a respective sample list 32 associated with it. Each sample list 32 comprises a list of pointers to the starts of the members 31 of the associated group 30. A style list 33 contains pointer to the first element of each of the sample lists 32.

The samples are programmed into the ROM 21 during manufacture of the phone 1.

Tunes can be built up from the musical samples 31 and any tune constructed from the samples can be represented by a first number identifying a style and a set numbers which maps onto the elements of the sample list 32 of the associated style.

In addition to the musical samples 31, the ROM 21 contains a ring setup program which enables a user to create and select ring signals constructed from the musical samples 31.

In order to set up the ring signal, the user of the mobile phone 1 selects a "ring setup" option from a displayed menu in the conventional manner. In the following, it is to be understood that the processing of user inputs and the generation of display images is performed by the controller 17 in accordance with the ring setup program.

Figure 4:
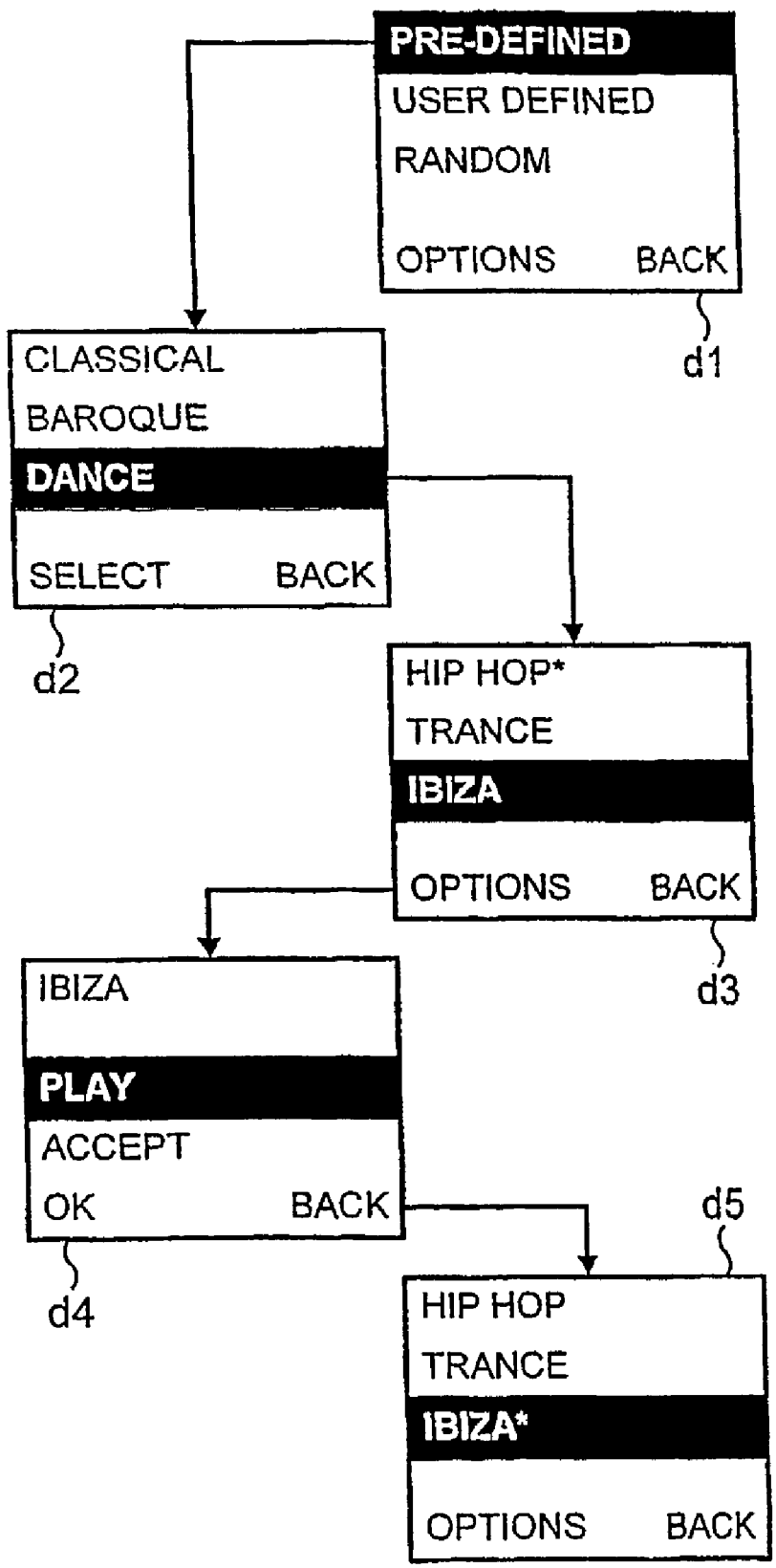
FIG. 4 is a flow diagram showing the display of the mobile phone of FIG. 1 during ring signal selection.

Referring to FIG. 4, on selecting the "ring setup" option, the user is presented with a first menu d1 which enables the user to choose between pre-defined (i.e. factory set) ring signals, user defined ring signals and randomly generated ring signals.

If the user selects the "pre-defined" option using the navigation key 10 and the left multifunction key 8a, a second menu d2 is displayed. The second menu m2 presents the user with a list of musical styles. The list of musical styles is produced by the controller 17 reading the names of the groups 30. The user can scroll up and down the list using the navigation key 10 and it will be appreciated that the list may contain more members than can be displayed simultaneously on the mobile phone's display 3.

When the user selects a style using the navigation key 10 and the left multifunction key 8, a third menu d3 is displayed. The third menu d3 presents the user with a list of pre-defined tunes in the chosen style.

The pre-defined tunes are also stored in the ROM 21. A predetermined region of the ROM 21 comprises a plurality of tune definitions, each comprising a style code (1 byte), a null-terminated name string and a set of 1 byte sample identifying codes terminated with a null character. The set of tune definitions is terminated by two null characters. In order to generate the third menu, the controller 17 reads through this area of the ROM 21, extracting and displaying the name strings for tunes having the appropriate style code.

If the location of any of the tune definitions matches the location of the currently selected tune definition, stored in the SIM card 19, an asterisk is displayed beside the tune's name.

If the user now presses the left multifunction key 8a, he is presented with a fourth menu d4. This menu is headed with the name of the tune selected in the third menu d3 and contains "Play" and "Accept" as options. If the user selects the "Play" option using the navigation key 10 and the left multifunction key 8a, the selected tune is played to the user by the controller 17 using the buzzer 22. This process will be explained in more detail below. If the user does not wish to use the selected tune, the user now presses the right multifunction key 8b to return to the third menu d3.

However, if the user does wish to use the selected tune, the. user selects "Accept" using the navigator key 10 and presses the left multifunction key 8a. This causes the controller 17 to save the location of the selected tune's definition in the ROM 21 in the SIM card 19 at a predetermined location, replacing the existing entry. The controller 17 then redisplays the third menu d3 which now has an asterisk beside the newly selected tune's name.

The user can repeatedly press the right multifunction key 8b to return to the mobile phone's main menu.

Figure 5:
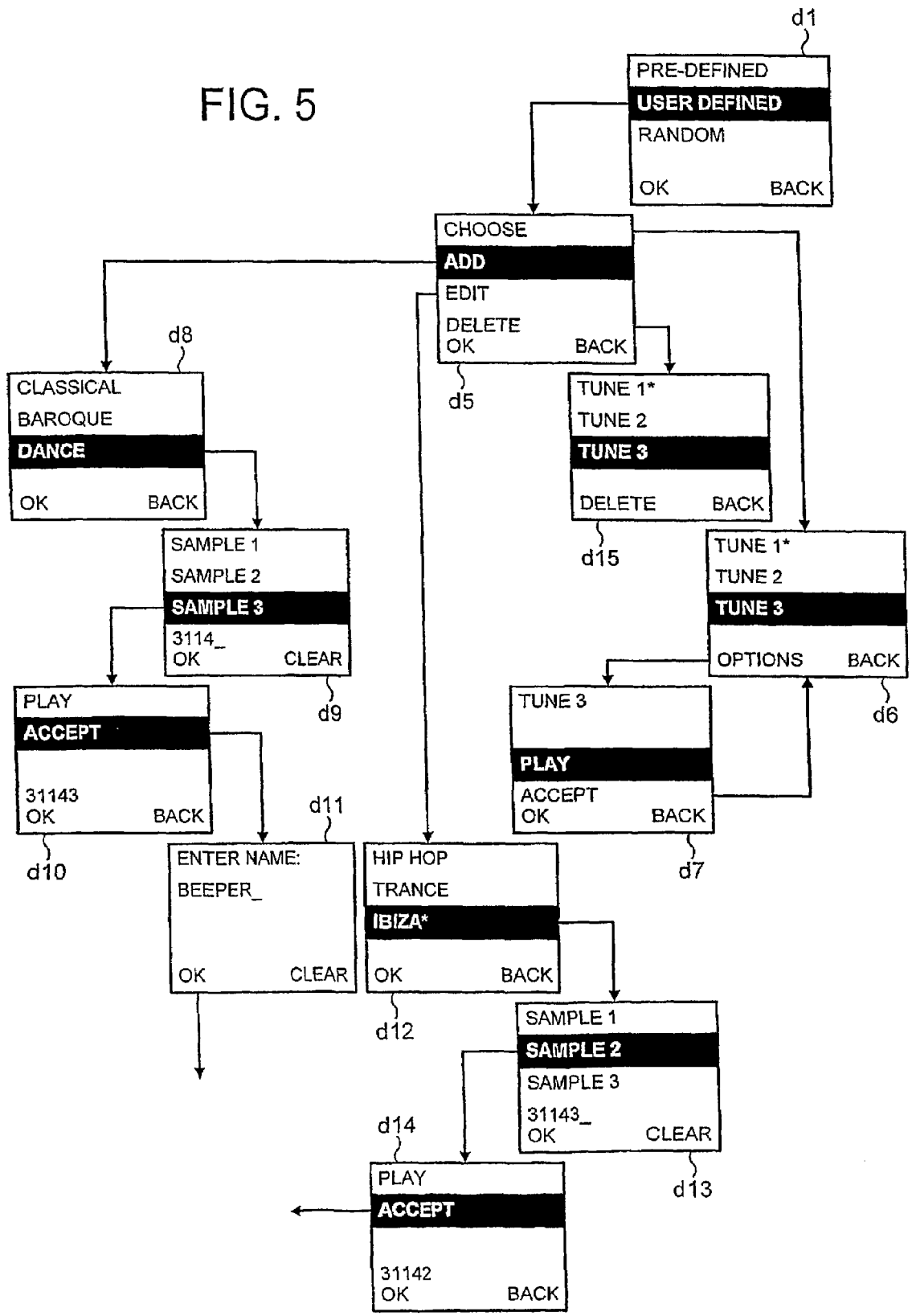
FIG. 5 is a flow diagram showing the display of the mobile phone of FIG. 1 during ring signal selection.

Referring to FIG. 5, if the user select "User defined" in the first menu d1, the user is presented with a fifth menu d5. The fifth menu d5 gives the user the options of choosing a tune that has already been created, adding a new tune, editing an existing tune and deleting an existing tune.

If the user selects the "Choose" option using the navigation key 10 and the left multifunction key 8a, the user is presented with a sixth menu d6. The sixth menu d6 is similar to the third menu d3. However, instead of displaying tunes whose definitions are in the ROM 21, the sixth menu d6 contains the tunes whose definitions are presently stored in the SIM card 19. These definitions are stored in the same format as those in the ROM 21 and if the location of any of them matches the location of the currently selected ring signal, an asterisk is displayed by its name.

The user can select and play tunes and set one as the current ring signal using a seventh menu d7 in the same way as for pre-defined tunes with the fourth menu d4.

If the user selects the "Add" option from the fifth menu d5, the user is presented with an eighth menu d8. The eighth menu d8 lists the style names from the groups 30. On selecting one of the styles using the navigation key 10 and the left multifunction key 8a, the user is presented with an ninth menu d9 listing the names of the musical samples 31 belonging to the selected style.

A user can select samples using the navigation key 10 and the left multifunction key 8a for addition to the new tune. When a sample name become highlighted by means of the navigation key 10, the named sample is played using the buzzer 22. The user can select the highlighted sample for addition to the tune by pressing the left multifunction key 8a, which causes the user to be presented with a tenth menu d10 giving the user the options of playing the new tune at its present state of development or accepting the new tune. If the user selects the play option in the tenth menu d10, the tune is played by the controller 17 using the buzzer 22.

If the tune is not complete and is not to be abandoned, the user presses the right multifunction key 8b and is returned to the ninth menu d9. The newly added sample will now be shown added to a list of the selected samples below the menu options. If the user now presses the right multifunction key 8b, the newly added sample is removed from the list. Further operations of the right multifunction key 8 will remove further samples, if there are any.

If, while the tenth menu d10 is being displayed, the user selects the "Accept" option, the user is presented with a name entry display d11. The user can then enter a name for the tune using the keypad 2. When at least one character has been entered, the user can press the left multifunction key 8a to store the new tune's definition in the SIM card 19 so that it can be selected using the "Choose" option in the fifth menu d5.

The foregoing illustrates the process of adding a new tune in general terms, it will therefore be understood that means will be provided to handle the case where adding the new tune will cause the available space in the SIM card 19 to be exceeded.

Returning now to the fifth menu d5, the user may select an "Edit" option. If the user selects the "Edit" option, the user is presented with an eleventh menu d12 which contains the names of all of the tunes stored in the SIM card 19. If a user now selects one of these tunes using the navigation key 10 and the left multifunction key 8a, the user is presented with a twelfth menu d13 which lists the names of all of the samples in the style of the selected tune and, below the list, the indices of the samples forming the tune.

With the twelfth menu d13 being displayed, the user can remove samples. from the tune by pressing the right multifunction key 8b and add samples to the tune and play the tune in the same manner as with the ninth and tenth menus d9, d10 using a thirteenth menu d14.

The thirteenth menu d14 provides the user with the option of accepting the changes to the selected tune and when this option is selected and the left multifunction key 8a pressed, the edited tune is stored in the SIM card 19 and the user is returned to the mobile phone's main menu. If the number of sample instances forming the tune has changed, the portion of the tune definition region of the SIM card 19, following the edited tune, will need to be rewritten after the edited tune has been stored.

Returning again to the fifth menu d5, the user can opt to delete a tune. If the user selects this option, the user is presented with a fourteenth menu d15 listing the names of all of the tunes defined in the SIM card 19. The user can then select one of these for deletion using the navigation key 10 and the left multifunction key 8a. When a tune has been selected for deletion, the controller 17 rewrites the tune definition region of the SIM card 19 so as to remove the tune definition for the tune to be deleted. The user is then returned to the mobile phone's main menu.

Figure 6:
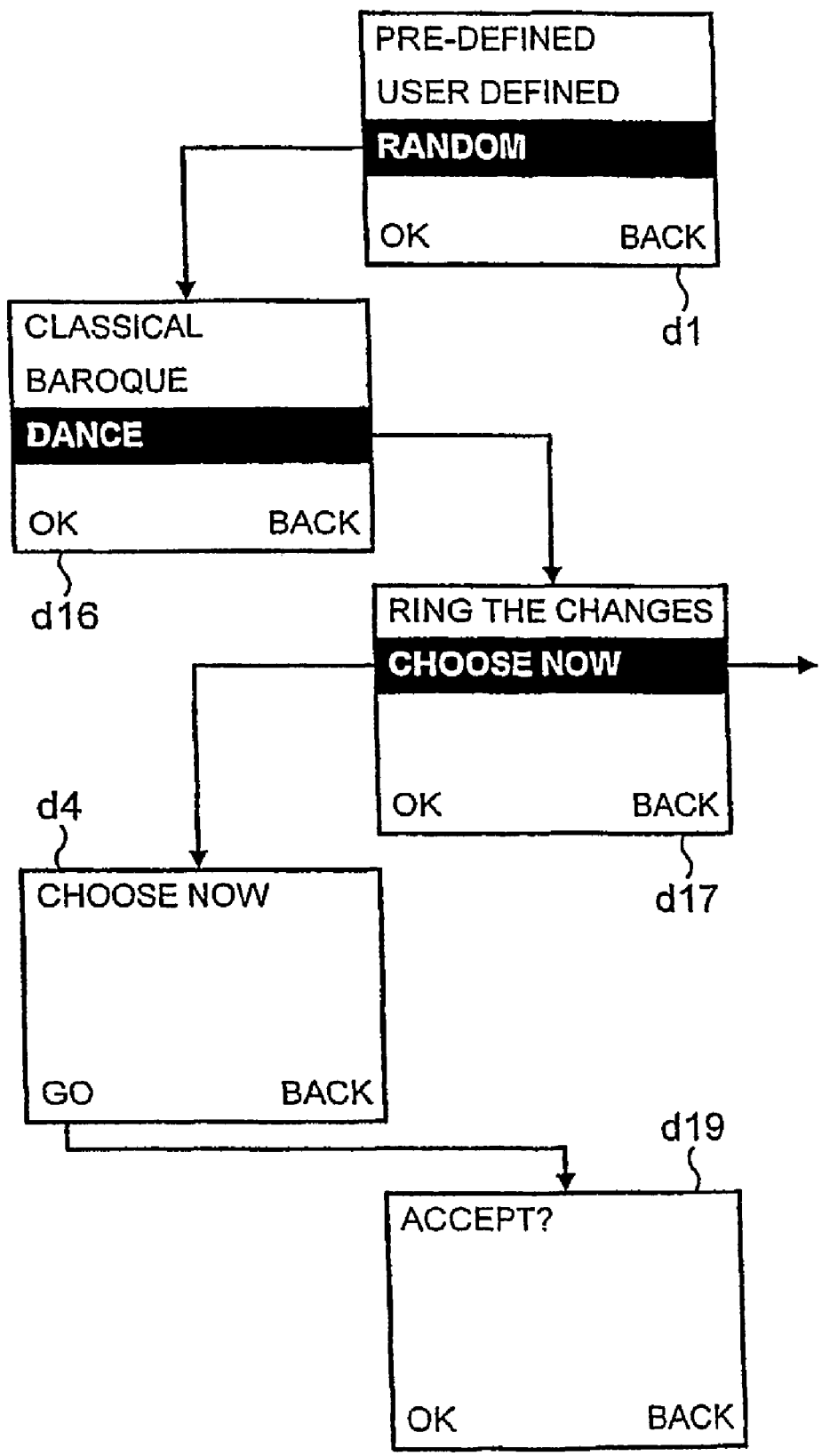
FIG. 6 is a flow diagram showing the display of the mobile phone of FIG. 1 during ring signal selection.

Referring to FIG. 6, if the user selects "Random" from the first menu d1, the uses is presented with a fifteenth menu d16 which lists the styles. When the user selects one of these styles, the user is presented with a sixteenth menu d17 which presents the user with two options, "Ring the Changes" and "Choose Now".

If the user selects "Ring the Changes", the controller 17 stores the style code followed by a null character in the tune definition region of the SIM card 19 and sets the selected tune location to this location. The user is then returned to the mobile phone's main menu.

At this point, it is appropriate to explain that when the user chooses a pre-defined or a user defined tune to be the ring signal, as described above, the controller 17 additionally scans the tune definition region of the SIM card 19 and deletes any entry which has a null character where the first character of the tune's name is expected to be.

If, however, the user selects "Choose Now", the user is presented with a choose display d18. If the user now presses the left multifunction key 8a, the generates a random sequence of sample indices and stores this sequence temporarily in a tune definition in the RAM 20 in the form: style code, null character, null character, sequence indices, null character. The controller 19 then plays the temporarily stored tune definition using the buzzer 22 and displays an accept/reject display d19. If the user does not like the tune, the user presses the right multifunction key 8b which returns the user to the chooser display d18. However, if the user likes the tune, the user presses the left multifunction key 8a and the temporarily stored tune definition is transferred to the SIM card 19. The selected tune location is then changed to point to the newly added tune definition and the user is returned to the mobile phone's main menu.

The process of playing a tune in response to an incoming call will now be described.

Figure 7:
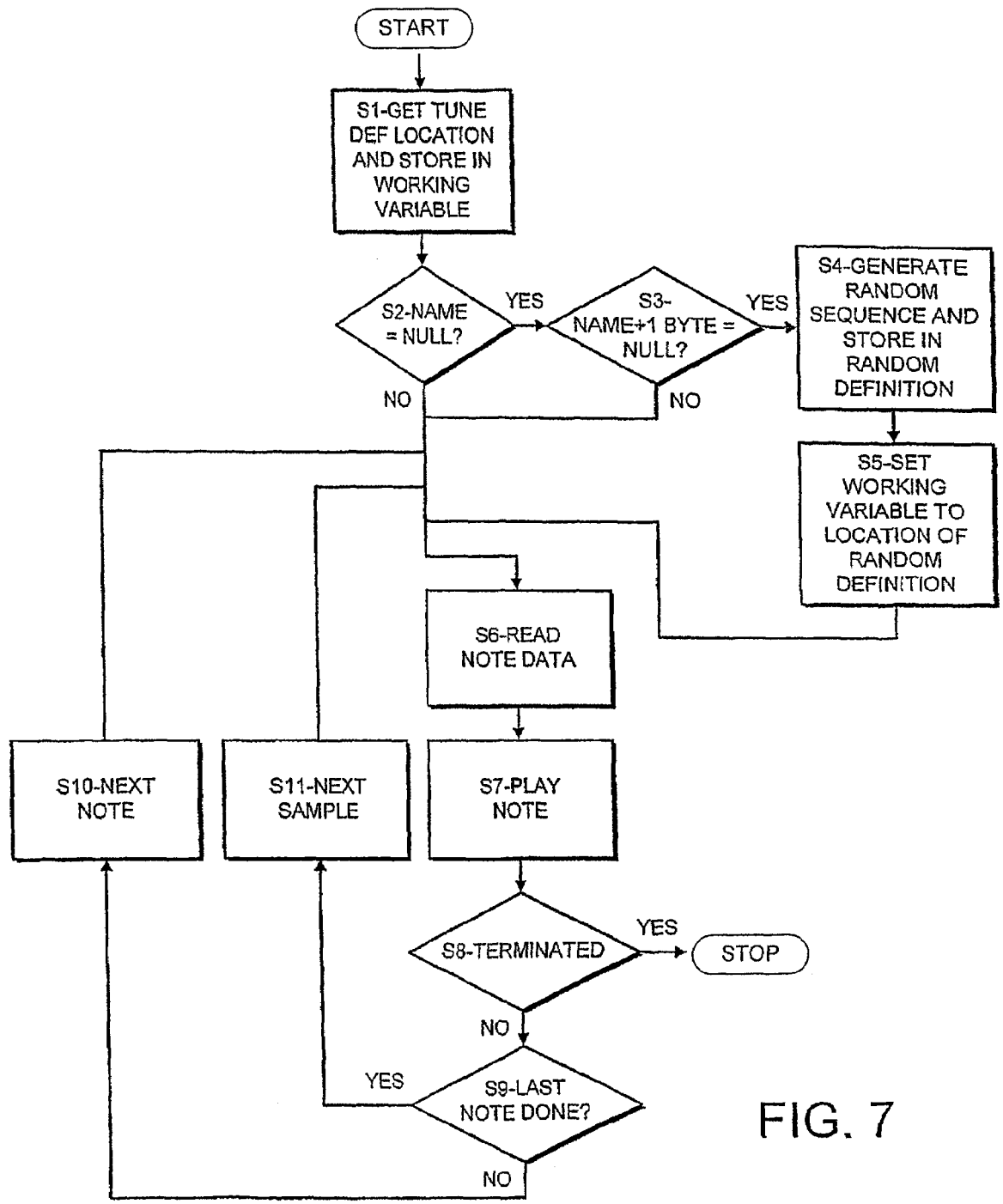
FIG. 7 is a flowchart illustrating the generation of a ring signal.

Referring to FIG. 7, when the controller 17 detects an incoming call, it enters a ring signal generation routine. In the ring signal generation routine, the controller 17 first transfers the current tune definition location to a working variable (step S1) and then tests the first byte of the current tune definition's name element to determine whether it is a null character (step S2). If it is a null character, the user has selected a random ring signal and the controller 17 then tests the next byte of the current tune definition to determine whether that too is a null character (step S3). If the result at step S3 is true, the user has selected "Ring the Changes" from the sixteenth menu d18 (FIG. 6) and the controller 17 generates a random sequence of samples, using the style defined by the style code of the current tune definition in the SIM card 19, and stores the resultant tune definition in the RAM 20 (step S4). The working variable is then changed to point to the newly created random tune definition in the RAM 20 (step S5).

Following step S5, and if no is the answer at either of steps S2 and S3, the controller 17 enters a loop for generating the actual ring signal.

In the loop, the controller 17 initially reads the data defining the first note of he first sample of the tune (step S6) and then outputs a signal to the buzzer in accordance with this data (step S7). In step S7, the controller 17 waits until the note's start time and then causes the port to which the buzzer 22 is coupled to change state at a rate corresponding to the note's pitch for the note's duration as defined by the note data.

Once the note has started to be produced, the controller 17 determines whether it should stop generating the ring signal, e.g. the call has been answered or rejected or the calling party has terminated the call, (step S8). If so, the controller 17 exits the routine otherwise it determines whether the last note of the current sample has been played (step S9). The notes are read from the samples as shown in FIG. 3 using the style and sample index values in the current tune definition to set a note pointer variable. If the last note of the current sample has not been played, the controller 17 changes the note pointer variable so that it points to the next note of the current sample (step S10).

If the last note of the current sample has been played, the controller 17 changes the note pointer variable to point to the first note of the next sample identified in the tune definition (in this scheme the last sample is followed by the first sample so that the tune is looped) (step S11) and returns to step S6.

Figure 8:
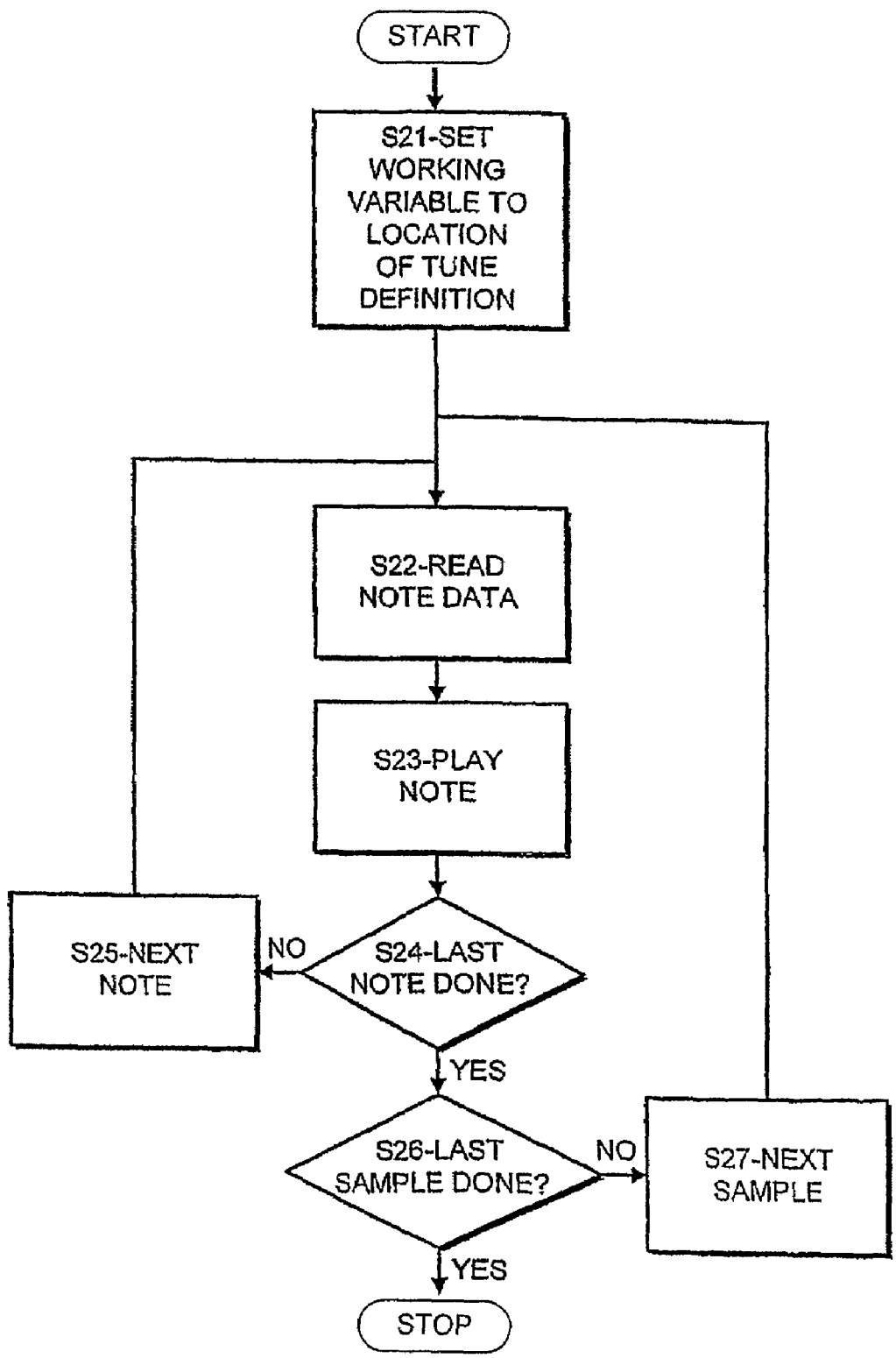
FIG. 8 is a flowchart illustrating the generation of a preview of a ring signal.

Referring to FIG. 8, when a tune or a partly completed tune is to be played during the configuration processes described above with reference to FIGS. 4, 5 and 6, a somewhat different ring signal generation routine is performed by the controller 17.

In this routine, the controller 17 loads the location of the definition of the tune or partly completed tune into the working variable (step S21). The controller 17 then reads the data for the first note from the ROM 21 of the first or only sample (step S22) and plays the note as described above (step S23). The controller 17 then determines whether the last note of the current sample has been played (step S24) and, if not, directs the note pointer variable to the next note of the current sample (step S25) and returns to step S22. Otherwise, the controller 17 determines whether the last sample has been played (step S26) and, if not, changes the note pointer variable so that it points to the first note of the next sample to be played (step S27). When all of the samples have been played, the routine terminates.

It will be appreciated that many modifications may be made to the embodiment described above. For instance, the allocation of samples to different styles may be omitted so that all of the samples are effectively in the same "group". Furthermore, a facility whereby a user can create a sample be entering the notes to be played using the keypad. The samples could also be created by extracting the necessary control data from a MIDI file on a personal computer and then transferring the sample data to the mobile phone using an irDA link or a serial cable.

In the embodiment described above, only the setting of the incoming call alert, i.e. ring signal, of a mobile phone has been described. The same process can also be employed to set the incoming message e.g. SMS message, alert signal.

During manufacture, the mobile phone or other device according to the present invention may be programmed from a copy of the control program stored on a magnetic disk or an optical disk.

Programming of mobile phones over the air is known and the present invention may be implemented by programming a mobile phone with a suitable control program over the air, i.e. by means of electromagnetic waves.

The invention claimed is:

1. A method comprising:
   facilitating detection of an incoming communication;
   generating a substantially random sequence of data, the sequence of data defining a plurality of musical samples;
   facilitating storage of the substantially random sequence of data in a memory;
   responding to the detection of an incoming communication by:
      reading said sequence of data from the memory, and
      generating an audio signal in dependence on said sequence of data,
      wherein each sample among said samples comprises at least one note and one of said samples comprises a plurality of notes, and wherein at least one sample comprises a first null character and a second null character;
   evaluating the first null character to determine that a user selected a random ring signal, the random ring signal corresponds to the random sequence of data;
   evaluating the second null character to determine that the user made a selection regarding the audio signal; and
   generating a random sequence of said samples using a style code, in response to evaluating the second null character,
   wherein said data comprises frequency-defining data and duration-defining data for each note of each sample among said samples, and
   wherein the frequency-defining data comprises a code representing pitch quantized according to a predetermined scale.

2. A method according to claim 1, wherein said data comprises timing data for each note of each sample.

3. A method according to claim 2, wherein the predetermined scale is the chromatic scale.

4. A method according to claim 1, further comprising facilitating storage of said music samples in the memory.

5. A method according to claim 4, further comprising responding to operation of a user input to generate at least one of said samples.

6. A method according to claim 1, further comprising responding to operation of a user input to generate said sequence of data.

7. A communication device comprising at least one memory storing software comprising instructions, the instructions comprising:
   a first instruction for facilitating detection of an incoming communication;
   a second instruction for generating a substantially random sequence of data defining a plurality of musical samples; and
   a third instruction for responding to said detected incoming communication by reading said substantially random sequence of data from said memory and generating an audio signal in dependence on said substantially random sequence of data,
   wherein each sample comprises at least one note and one of said samples comprises a plurality of notes, at least one sample comprises a first null character and a second null character, and
   wherein said data comprises frequency-defining data and duration-defining data for each note of each sample, the frequency-defining data comprising a code representing pitch quantized according to a predetermined scale;
   a fourth instruction for evaluating the first null character to determine that a user selected a random ring signal, the random ring signal corresponds to the random sequence of data;
   a fifth instruction for evaluating the second null character to determine that the user made a selection regarding the audio signal; and
   a sixth instruction for generating a random sequence of said samples using a style code, in response to evaluating the second null character.

8. The communication device according to claim 7, wherein said data comprises timing data for each note of each sample.

9. The communication device according to claim 7, wherein said predetermined scale is the chromatic scale.

10. The communication device according to claim 7, further comprising a seventh instruction for facilitating storage of said music samples in a first memory.

11. The communication device according to claim 10, further comprising an eighth instruction for generating at least one of said samples in response to receipt of a user input.

12. The communication device according to claim 11, further comprising a ninth instruction for generating said sequence of data in response to receipt of the user input.

13. The communication device according to claim 7, wherein said first, second and third instructions are represented by temporal or spatial variation of a physical property.

14. The communication device according to claim 13, wherein the physical property is charge in a memory cell.

15. The communication device according to claim 13, wherein the physical property is magnetic field magnitude or orientation.

16. The communication device according to claim 13, wherein the physical property is reflectivity.

17. The communication device according to claim 13, wherein the physical property is the phase or amplitude of an electromagnetic wave.

18. An apparatus comprising:
   at least one processor; and at least one memory including computer program code, the at least one memory and the computer program code configured to, with the at least one processor, cause the apparatus to perform at least the following;

facilitate detection of an incoming communication;

generate a substantially random sequence of data, the sequence of data defining a plurality of musical samples;

facilitate storage of the substantially random sequence of data in the memory;

respond to the detection of an incoming communication by:
  reading said sequence of data from the memory, and generating an audio signal in dependence on said sequence of data, wherein each sample among said samples comprises at least one note and one of said samples comprises a plurality of notes, at least one sample comprises a first null character and a second null character; and evaluate the first null character to determine that a user selected a random ring signal, the random ring signal corresponds to the random sequence of data;

evaluate the second null character to determine that the user made a selection regarding the audio signal; and generate a random sequence of said samples using a style code, in response to evaluating the second null character, wherein said data comprises frequency-defining data and duration-defining data for each note of each sample among said samples, and wherein the frequency-defining data comprises a code representing pitch quantized according to a predetermined scale.

19. A method according to claim 1, wherein each of the plurality of samples comprises a number identifying a style.

20. The communication device according to claim 7, wherein each of the plurality of samples comprises a number identifying a style.

21. The apparatus according to claim 18, wherein each of the plurality of samples comprises a number identifying a style.

22. A method according to claim 1, wherein
the style code is defined by a number.

23. The communication device according to claim 7, wherein the style code is defined by a number.

24. The apparatus according to claim 18, wherein the style code is defined by a number.

25. The apparatus according to claim 18, wherein said data comprises timing data for each note of each sample.

26. The apparatus according to claim 18, wherein the predetermined scale is the chromatic scale.

27. The apparatus according to claim 18, wherein the memory is rewritable.

28. The apparatus according to claim 18, wherein the at least one memory and the computer program code are configured to, with the at least one processor, cause the apparatus to:
  facilitate receipt of a user input: and
  generate at least one of said samples in response to receipt of the user input.

29. The apparatus of according to claim 28, wherein the at least one memory and the computer program code are configured to, with the at least one processor, cause the apparatus to generate said sequence of data in response to receipt of the user input.

30. The apparatus according to claim 18, wherein the apparatus comprises at least one of a mobile phone or a communication device.

* * * * *